Sept. 29, 1953   R. A. WEAVER   2,653,653
CIRCUMFERENTIALLY ADJUSTABLE TIRE REMOVING DEVICE
Filed Nov. 1, 1951   2 Sheets-Sheet 1
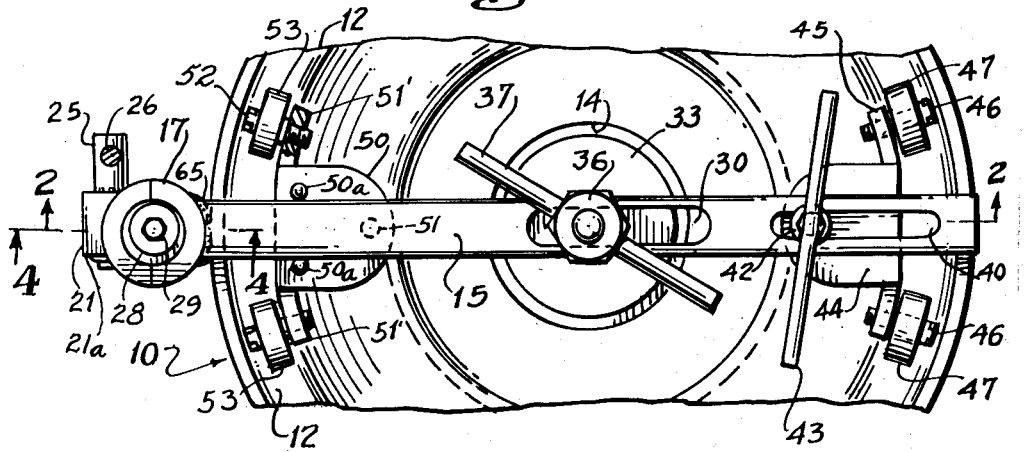
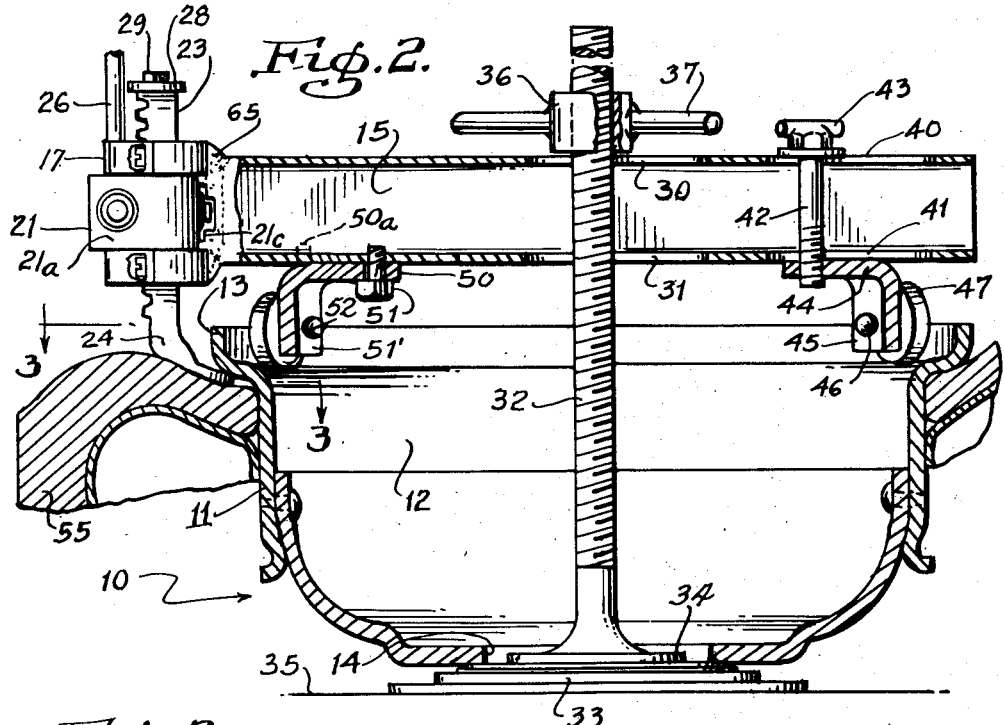
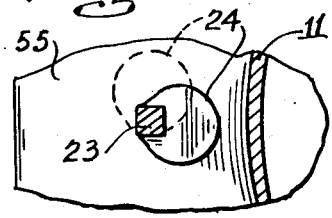
INVENTOR.
Raymond A. Weaver
BY
Robt. D. Pearson
ATTORNEY.

Sept. 29, 1953 R. A. WEAVER 2,653,653
CIRCUMFERENTIALLY ADJUSTABLE TIRE REMOVING DEVICE
Filed Nov. 1, 1951 2 Sheets-Sheet 2
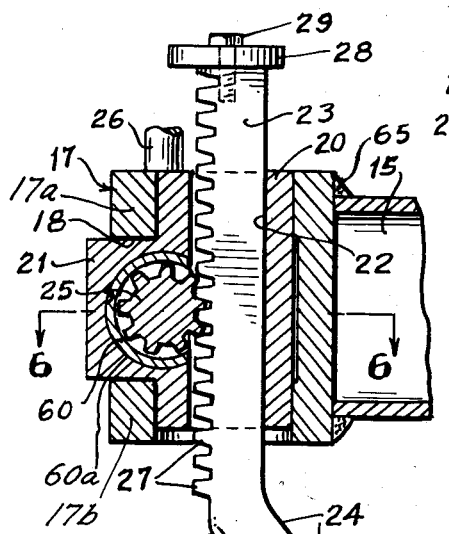
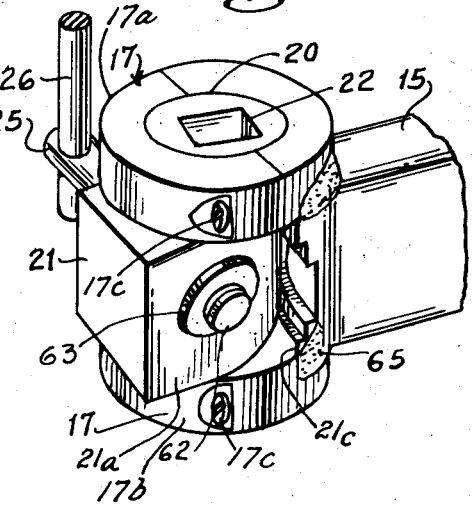
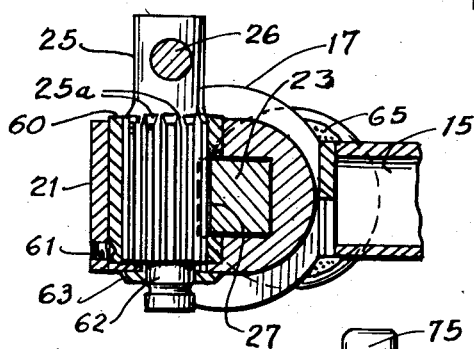
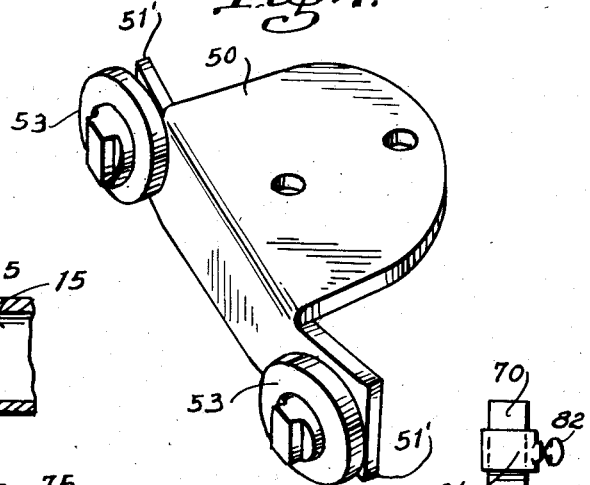
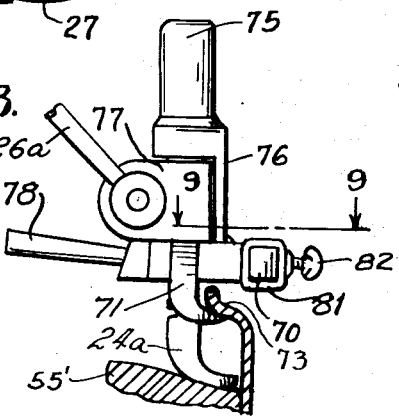
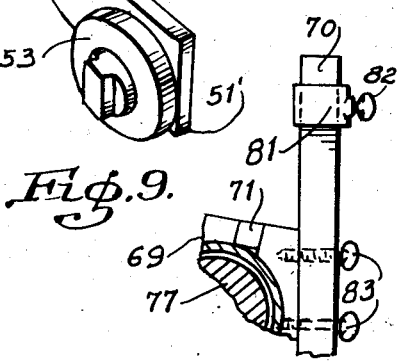
INVENTOR.
Raymond A. Weaver
BY
Robt. D. Pearson
ATTORNEY.

Patented Sept. 29, 1953

2,653,653

UNITED STATES PATENT OFFICE 2,653,653

CIRCUMFERENTIALLY ADJUSTABLE TIRE REMOVING DEVICE

Raymond A. Weaver, Los Angeles, Calif.

Application November 1, 1951, Serial No. 254,248

7 Claims. (Cl. 157—1.24)

This invention relates to a device for removing automobile tires from wheel rims.

One object of the invention is to provide a device of the above stated kind which is particularly well adapted for use in removing heavy truck tires used on automobile trucks. With this end in view the device is provided with a sturdy presser foot and very strong means for supporting the same on a truck wheel so that said presser foot may have a powerful leverage applied to it to force the bead of the tire off from the wheel.

Another object is to provide an improved turntable like structure for supporting a presser foot in a rotationally adjustable manner with reference to the wheel, so that said presser foot may be advanced around the wheel in a speedy, more satisfactory manner and repeatedly actuated to progressively loosen the tire bead from the wheel rim, but the claimed invention is not limited to the use of a turnable structure.

A more specific object is to provide an improved presser foot mounting bridge member which is adjustably clampable to the wheel body in positions wherein it diametrically bridges the wheel rim.

Yet another object is to provide an improved, powerful, lever operable means for mounting the presser foot upon said bridge member and for forcing said presser foot against the tire to be removed.

Other objects, advantages and features of invention will hereinafter appear.

Referring to the accompanying drawings illustrative of preferred embodiments of the invention, Fig. 1 is a fragmentary plan view of the tire compressor positioned upon the rim portion of a wheel of an automobile truck.

Fig. 2 is a vertical section on line 2—2 of Fig. 1.

Fig. 3 is a fragmentary horizontal section on line 3—3 of Fig. 2, the broken line indicating the inoperative position of the presser foot.

Fig. 4 is a fragmentary vertical section on line 4—4 of Fig. 1.

Fig. 5 is a perspective view of the lever operated tire removing member, a fragment of the bridge member and of the operating lever being included in the view.

Fig. 6 is a fragmentary horizontal section on line 6—6 of Fig. 4.

Fig. 7 is a perspective view separately showing one member of the pair of brackets that supports the bridge member, said brackets carrying wheels to travel along the rim portion of a truck wheel.

Fig. 8 is a side elevation of a modification of the presser foot arrangement.

Fig. 9 is a fragmentary section on line 9—9 of Fig. 8.

Referring in detail to the drawings, the automobile truck wheel 10 comprises a central body portion 11 shown riveted to a rim 12 having along one edge the outwardly offset, circular, tire retaining lip 13, said wheel having a spacious circular central opening 14.

An elongated bridge member 15 is provided, Figs. 1 and 2, showing said bridge member mounted in an overlying relation to said wheel rim in a position wherein it diametrically shows the space encircled thereby. Said bridge member is shown as consisting of a hollow beam of rigid metal substantially rectangular in cross-section, having one end open, and its opposite end carrying a cylindrical housing 17 which, when said bridge member is in its mounted position is located in an outwardly adjacent relation to the aforesaid circular wheel rim lip 13, the axis of said housing then extending parallel to the axis of the wheel 7. Said housing has a spacious opening 18 through the side thereof which is directed away from said bridge member 15.

Turnably fitted within said tubular housing is a stub-shaft 20 which has a lateral, radially projecting part 21 extending through said housing opening 18, thus limiting to less than a complete rotation the turning movement of said stub-shaft, a ninety degree swing of said stub-shaft being sufficient. The side face 21a of said projection 21 is positioned to register with a stop member 21c, best shown in Fig. 5, to limit the rotational movement of said stub-shaft 20. Said stop member is formed on member 15.

Said stub-shaft has through it a longitudinal passage 22 which is polygonal (shown as square), in cross section, and a rack bar 23 is slidably fitted in said passage, said rack bar carrying at its lower end a laterally directed presser foot 24 engageable under the flange of the rim of a tire carried by the truck wheel. Said presser foot is downwardly inclined and approximately circular as viewed in plan.

A pinion shaft 25 is rotatably mounted in the inner part of the aforesaid projecting part 21 of the stub shaft 20, said pinion shaft 25 being manually rotatable by means of an operating bar 26 which passes diametrically through it; and having, extending around it, a set of gear teeth 25a which are in mesh with the teeth 27 of said rack bar 23. This rack bar is shown carrying at its upper end a stop plate 28 to limit its downward movement, said plate being attached to the rack bar by a screw 29. Said operating bar 26 may be slidably fitted within a base provided for it in the pinion shaft 25, so that leverage may be increased by positioning the bar with one of its end portions in the bore.

Returning to the hollow bridge member 15, said member as viewed in Figs. 2 and 3, as to its cross section has a height considerably greater than its width to adapt it to withstand great vertical stresses. In its midlength portion said bridge member has, through its upper side a spacious longitudinal slot 30 which is matched by a similar slot 31 through its lower side.

An externally screwthreaded clamping post 32 is provided to clamp the bridge member 15 in its mounted position upon the automobile wheel, said post carrying a circular base plate structure the lower part 33 of which is of greater diameter than the aforesaid opening 14 in the wheel body, the upper part 34 of said base plate structure being shown of a somewhat less diameter than the aforesaid opening 14 and contained within said opening, where it aids the workman properly to center said post in relation to the wheel 10. The aforesaid broad basal part 33 is shown resting upon a horizontal surface designated 35. Said post 32 is shown projecting upwardly through the opposed slots 30, 31 and provided at its upper end with a large clamping nut 36 carrying diametrically opposite radial bars 37 for its manual operation, said nut being wider than the underlying slot 30 so as to be usable to exert a downward clamping action upon the bridge member 15.

Near its right hand end as viewed in Figs. 1 and 2 said bridge member has through its top wall a longitudinal slot 40 with which cooperates a like slot 41 through its lower wall. Through these two slots, and adjustable along them, extends a vertical clamping bolt 42 provided with a head structure which includes a cross bar 43 manually usable to screw the lower end portion of the bolt more or less into one limb of an angular plate which forms a clamp jaw 44, the other limb of said angular plate having lower corner portions each provided with an ear 45 having screwed into it a pin 46 upon which is rotatably mounted a roller 47, the two rollers thus mounted being positioned to travel along the rim portion of the wheel 10 interiorly of its aforesaid lip 13.

Near the opposite end of the bridge member an angular bracket 50 is secured thereto by cap screws 51, said bracket having a downwardly directed part, and being shaped like the already described clamp member 44, so as to have spaced apart ears 51' each of which has screwed into it a pin 52 carrying a roller 53 functioning like the aforesaid rollers 47, all of said rollers forming parts of carriages which can travel along the wheel rim. Said bracket 50 is provided with stop pins 50a extending upwardly and adjacent to each side of said bridge member with a predetermined clearance therebetween, and a distance from said cap screw 51, to provide a slight rotational movement of the rollers 53 about the screw 51 as its fulcrum member, thus providing a self aligning means for the wheels 53 upon the wheel rim 12.

Owing to the fact that the rack bar 23 is longitudinally slidable (though not rotatable), in relation to the stub shaft 20, lengthwise through which it passes; and said stub shaft is turnable within the tubular housing 17, said rack bar can not only be reciprocated in the direction of its length, but can also be rotated about its axis. This enables the workman to operate the lever 26 in such a manner as to swing the toe portion of the presser foot 24 under the lip 13 of the wheel rim (see Fig. 2), and then apply pressure to the tire by means of said presser foot so as to force toward the opposite end of the wheel the part of the tire bead to which said presser foot is applied. Preparatory to doing this the workman will place the post 32 (with the nut 36 removed), axially within the wheel 10 and will rest said wheel and post upon a supporting surface 35, as shown in Fig. 2. Thereupon he will put the bridge member 15 into place upon the rim portion of the wheel 10, lowering the slotted midlength part of said bridge member over the upper end portion of said post, so that the upper part of said post is in position to have applied to it the clamping nut 36, which will then be applied to the post and screwed down against the bridge member to provide a running fit for said rollers 47.

With the parts thus assembled, after the tire has been loosened at one spot, the bridge member will be turned a short distance so that the presser foot 24 can be used to press another part of the tire partly off from the wheel. This operation will be repeated until all circumferential portions of the tire (and its rim bead) have been loosened from the wheel. Whenever the lever 26 is operated to force the pressure foot against a tire, the carriage under the opposite end of the bridge member supports said member against tilting, in opposition to the pressure applied thereto by the operation of said lever.

A few additional structural details will be mentioned. The preferred way of mounting the pinion shaft 25 is shown in Figs. 4 and 5 where a bearing sleeve 60 is shown around said shaft, said sleeve fitting inside a circular passage 60a and being held in place by a set screw 61. (See Fig. 6.) Said passage or bore 60a is diametrically contracted at one end and within its diametrically contracted part fits and projects a diametrically reduced end portion 62 of said shaft 25 on which is press fitted or otherwise secured a retaining collar 63.

In order to facilitate assembling the device the tubular housing generally designated 17 in Fig. 5 is provided with a conventional upper arcuate bearing cap 17a and lower arcuate bearing cap 17b, these caps being held in place by conventional cap screws 17c.

The housing 17 is desirably secured to an end of the bridge member 15 by means of welds 65.

In the modified presser foot arrangement shown in Figs. 8 and 9 a base member 69 and mounting bar 70 are provided to rest upon a short segment of a wheel rim and be held thereto by means of a pair of adjacent clamping members 71 which have deflected lower end portions to engage the lower side of the upper edge portion of the wheel rim. Also an upwardly directed handle member 75 is shown secured to this modified tool by means of a segmented shank 76. The horizontally swingable block body 77 immediately under said handle corresponds to and functions like the member 20 already described. An auxiliary handle 78 is provided to aid the workman in handling this modified tool.

With the pair of symmetrically positioned lower clamping members 71, one near each side of the presser foot 24a, co-operates with the aforesaid upper clamping bar 70, positioned to rest upon the upper side of the wheel rim, this bar carrying a pair of adjustable square sleeves 81 secured when desired along the bar by set screws 82, said sleeves interiorly engaging the wheel rim and aiding in keeping said bar in place thereon, as will be understood by noting the shape of the wheel rim lip 13 shown in Fig. 2. Said bar 70 is shown secured to the body portion of the modified structure by cap screws 83. It is to be understood that, in regard to the bar 70 and parts carried thereby, the broken off part of the structure in the right hand portion of Fig. 9 is duplicative of the part thereof which is shown. In Fig. 8 the modified device is shown provided with an operating bar 26a, corresponding to the aforementioned operating bar or lever 26.

I claim:

1. A tire removing device of the kind described comprising a bridge member, means for mounting said bridge upon the rim of an automobile wheel in a rotationally adjustable manner and in a position wherein it diametrically spans said rim in all adjusted positions, a cylindrical housing carried by an end portion of said bridge member, when said member is in mounted position the axis of said housing extending parallel to the axis of the wheel upon which said bridge member is mounted and said housing being then located in an outwardly adjacent and upwardly offset relation to said wheel rim, a stub shaft turnably fitted within said housing, said housing having through its side an opening and said stub shaft having a lateral projection extending through said opening, thus limiting to less than a complete rotation the turning of said stub shaft, said stub shaft having through it a longitudinal passage polygonal in cross section, a rack bar slidably fitted within said passage, said rack bar having at its lower end a laterally directed presser foot engageable with the tire carried by the automobile wheel, a gear toothed pinion shaft rotatably mounted in said projection of said stub shaft, the teeth of said pinion shaft being in mesh with the teeth of said rack bar, and means to turn said pinion shaft.

2. In a tire removing device of the kind described, a bridge member having a longitudinally slotted midlength portion, a screwthreaded clamp post having an expanded base portion upon which rests concentrically the automobile wheel when said post is in its operative position, at which time said post projects upwardly through said slotted part of said bridge member and the latter diametrically spans the wheel, a clamping member down-screwable upon said post above said bridge member to draw the latter toward the wheel rim, two carriages secured to the under side of said bridge member and positioned so as to travel along diametrically opposite portions of the wheel rim, and a lever operable presser foot carried by said bridge member in a position for operation against a tire bead on said wheel, during which operation one of said carriages supports said bridge member in opposition to the pressure applied thereto by said clamping member and the operation of said lever.

3. In a device of the kind described, mounting means securable to the rim portion of a tire-carrying automobile wheel, an elongated housing carried by said mounting means, when the latter is in its secured position the axis of said housing extending parallel to the axis of the automobile wheel a turnable tubular shaft within said housing, a rack bar extending lengthwise of said shaft and slidably supported thereby, a gear toothed member rotatably mounted upon said shaft with its teeth in mesh with the teeth of said rack bar, and a presser foot carried by said rack bar and engageable with the tire in the operation of removing the latter from the automobile wheel.

4. In a device of the kind described, the combination, with a bridge member mountable upon the rim portion of an automobile wheel in a position wherein it diametrically spans said rim portion, and tire removing means carried by said bridge member; of a pair of carriages carried by said bridge member and applicable to diametrically opposite parts of the tire rim to travel therealong during rotational adjustment of said bridge member in relation to said wheel rim, said carriages each comprising a plate consisting of two portions angularly related to each other, means whereby one of said plate portions is secured in a flatwise manner to said bridge member, and roller means carried by the other of said plate portions to travel along the rim portion of the wheel being operated upon.

5. In a device of the kind described, mounting means securable to the rim portion of a tire-carrying automobile wheel, a bearing means carried by said mounting means and positionable adjacent to the rim of an automobile wheel to which said mounting means is secured, a rack bar supported by said bearing means, said supported rack bar being longitudinally movable and being turnable about its axis, a presser member carried by said rack bar and engageable with a tire on the automobile wheel, and a lever carried by said rack bar and operable both to rotate the latter and forcibly to move it longitudinally to free the tire bead from the wheel.

6. The subject matter of claim 5, and said mounting means being rotatably adjustable in relation to the rim of the automobile wheel progressively to change the position of said rack bar along the wheel rim.

7. In a device of the kind described, mounting means securable to the rim portion of a tire-carrying automobile wheel, an elongated housing carried by said mounting means, when the latter is in its secured position the axis of said housing extending parallel to the axis of the automobile wheel, a support within said housing turnable therein about the axis of the housing, a vertical bar carried by said support and turnable together therewith, said bar being vertically adjustable within said support, and a presser foot carried by the lower end of said bar and engageable with the tire in the operation of removing the latter from the automobile wheel, said bar in one of its rotational positions bringing said presser foot into an engaging relation to the automobile tire, and in another rotational position maintaining said presser foot in a disengaged relation to the tire.

RAYMOND A. WEAVER.

References Cited in the file of this patent

UNITED STATES PATENTS

| Number | Name | Date |
|---|---|---|
| 1,451,344 | Robinett | Apr. 10, 1923 |
| 1,615,469 | McKenzie | Jan. 25, 1927 |
| 1,646,511 | Weaver et al. | Oct. 25, 1927 |
| 1,793,863 | Manley | Feb. 24, 1931 |
| 2,512,864 | Koester | June 27, 1950 |
| 2,520,330 | Northrup et al. | Aug. 29, 1950 |
| 2,537,189 | King | Jan. 9, 1951 |